United States Patent
Bogin et al.

(10) Patent No.: US 6,658,533 B1
(45) Date of Patent: Dec. 2, 2003

(54) METHOD AND APPARATUS FOR WRITE CACHE FLUSH AND FILL MECHANISMS

(75) Inventors: Zohar Bogin, Folsom, CA (US); Steven J. Clohset, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 242 days.

(21) Appl. No.: 09/667,405

(22) Filed: Sep. 21, 2000

(51) Int. Cl.[7] .............................................. G06F 12/00
(52) U.S. Cl. ...................................... 711/135; 711/133
(58) Field of Search ................................ 711/133, 135, 711/134, 136, 118, 147, 146

(56) References Cited

U.S. PATENT DOCUMENTS

| | | | |
|---|---|---|---|
| 5,555,391 A | * 9/1996 | De Subijana et al. ....... | 395/440 |
| 5,845,325 A | * 12/1998 | Loo ............................ | 711/135 |
| 5,895,488 A | * 4/1999 | Loechel ...................... | 711/135 |
| 5,909,699 A | * 6/1999 | Sarangdhar et al. ........ | 711/146 |
| 6,356,485 B1 | * 3/2002 | Proebsting ............. | 365/189.01 |
| 6,401,175 B1 | * 6/2002 | Tremblay et al. ........... | 711/147 |
| 6,412,045 B1 | * 6/2002 | DeKoning et al. .......... | 711/135 |

* cited by examiner

Primary Examiner—Kimberly McLean-Mayo
(74) Attorney, Agent, or Firm—John F. Travis

(57) ABSTRACT

A write cache that reduces the number of memory accesses required to write data to main memory. When a memory write request is executed, the request not only updates the relevant location in cache memory, but the request is also directed to updating the corresponding location in main memory. A separate write cache is dedicated to temporarily holding multiple write requests so that they can be organized for more efficient transmission to memory in burst transfers. In one embodiment, all writes within a predefined range of addresses can be written to memory as a group. In another embodiment, entries are held in the write cache until a minimum number of entries are available for writing to memory, and a least-recently-used mechanism can be used to decide which entries to transmit first. In yet another embodiment, partial writes are merged into a single cache line, to be written to memory in a single burst transmission.

8 Claims, 6 Drawing Sheets

Fig. 1        Prior Art

METHOD AND APPARATUS FOR WRITE CACHE FLUSH AND FILL MECHANISMS

BACKGROUND OF THE INVENTION

1. Field of the Invention

The invention pertains generally to computer systems. In particular, it pertains to a write cache for writing data to memory.

2. Description of the Related Art

Because processors can typically operate at much faster speeds than their main memory, most computer systems now use high-speed cache memory as local memory that the processor can access for most of its needs. However, although cache memory is fast, it is also much more expensive than the dynamic random access memory (DRAM) typically used for main memory, and the amount of available cache memory is typically only a fraction of the amount of DRAM memory in the system. Since much software involves repetitive execution of the same code, it is feasible to copy the code about to be executed from main memory into cache memory, where it can then be repetitively executed at high speed. Because copying from a slower memory also takes time, many computer systems have a hierarchy with multiple levels of cache, with each subsequent level being faster and smaller than the one below it, and main memory at the bottom of the hierarchy.

Whenever a processor (CPU) or other device executes a write function, it is changing the contents of one or more memory locations. Due to the cached memory structure, this change happens first in the cache memory from which the processor is executing. This data must then be updated in main memory (and any lower levels of cache memory) to maintain consistency and preserve the change for future use. Since burst transfers are generally more efficient overall than individual word or byte transfers, the data is written back to main memory in blocks of predetermined size, with each block containing whatever changes were made to the data in that block.

Many conventional systems employ write-through cache. In a write-through cache memory system, each time data is written (i.e., changed) into cache, the changed cache line is written back to memory so that cache and main memory will be in agreement and other devices reading the changed memory location will not be reading "stale" data that is no longer correct. This is typically done by writing each changed block of data to a buffer, or queue, from where it can be written back to memory as the competing demands on the memory system allow.

A conventional system 10 is shown in FIG. 1. A CPU 11 is closely coupled to a cache memory 12, which contains the code and data currently being executed and also the code and data that was recently executed. Data that has been written to cache is also written to main memory 13 by transmitting it to I/O control logic 14, from where it is placed into write queue 16 to await its turn to be written into memory 13. As it exits write queue 16, the appropriate address and data signals are presented to memory controller 18, which opens the page in memory 13 and writes the data to the selected locations within that page. Graphics controller 17 can also read and write data to memory, as can multiple devices on the input-output (I/O) buses interfaced to bus controller 15, so I/O control logic 14 arbitrates the write requests from these various sources and places them into write queue 16.

Since multiple devices can try to write data to main memory 13 at the same time, write queue 16 allows the memory system to collect these competing memory requests, but it does nothing to change the order or grouping of the data being written to memory. There are several deficiencies in this conventional process:

1) Since the various sections of memory that are being changed may belong in scattered pages of memory, multiple pages of memory must be sequentially opened and closed. Opening a page of memory is time-consuming; sequentially opening several can significantly affect the efficiency of memory operations.

2) Writing several blocks of data into a page separately is inefficient. But the order in which those blocks are accepted and written is somewhat random, and conventional systems have no mechanism to save up a group of related blocks and organize them for a smaller number of burst transmissions.

3) Various parts of the data in a single cache line may be written at different times. Initiating a separate block of writes for each one is inefficient, but conventional systems have no mechanism to collect separate partial writes to the same cache line for a single burst transmission.

DETAILED DESCRIPTION OF THE INVENTION

The invention incorporates a write cache to collect the various portions of data to be written back to main memory, and organizes them in a more efficient manner before writing the data to memory.

Figure 1:
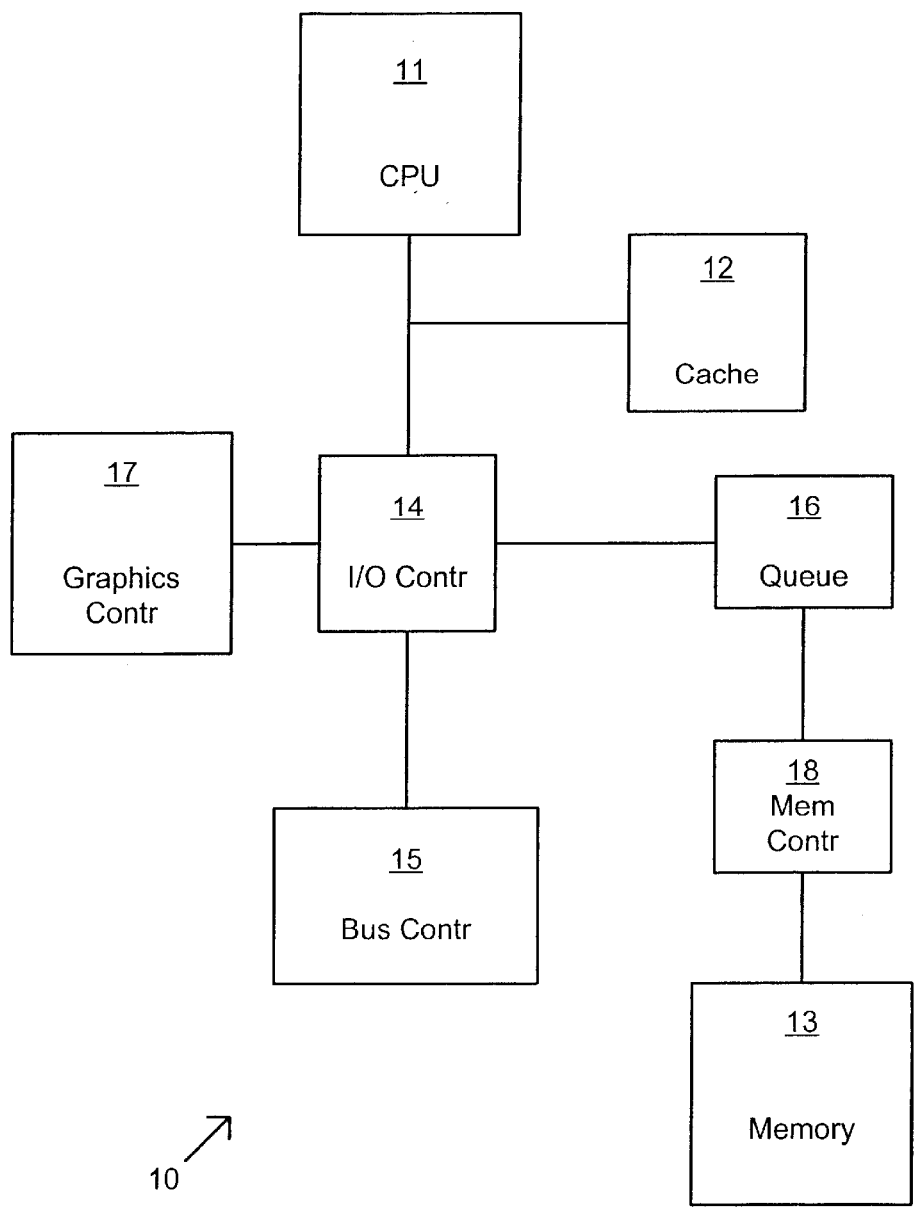
FIG. 1 shows a computer system of the prior art.
Figure 2:
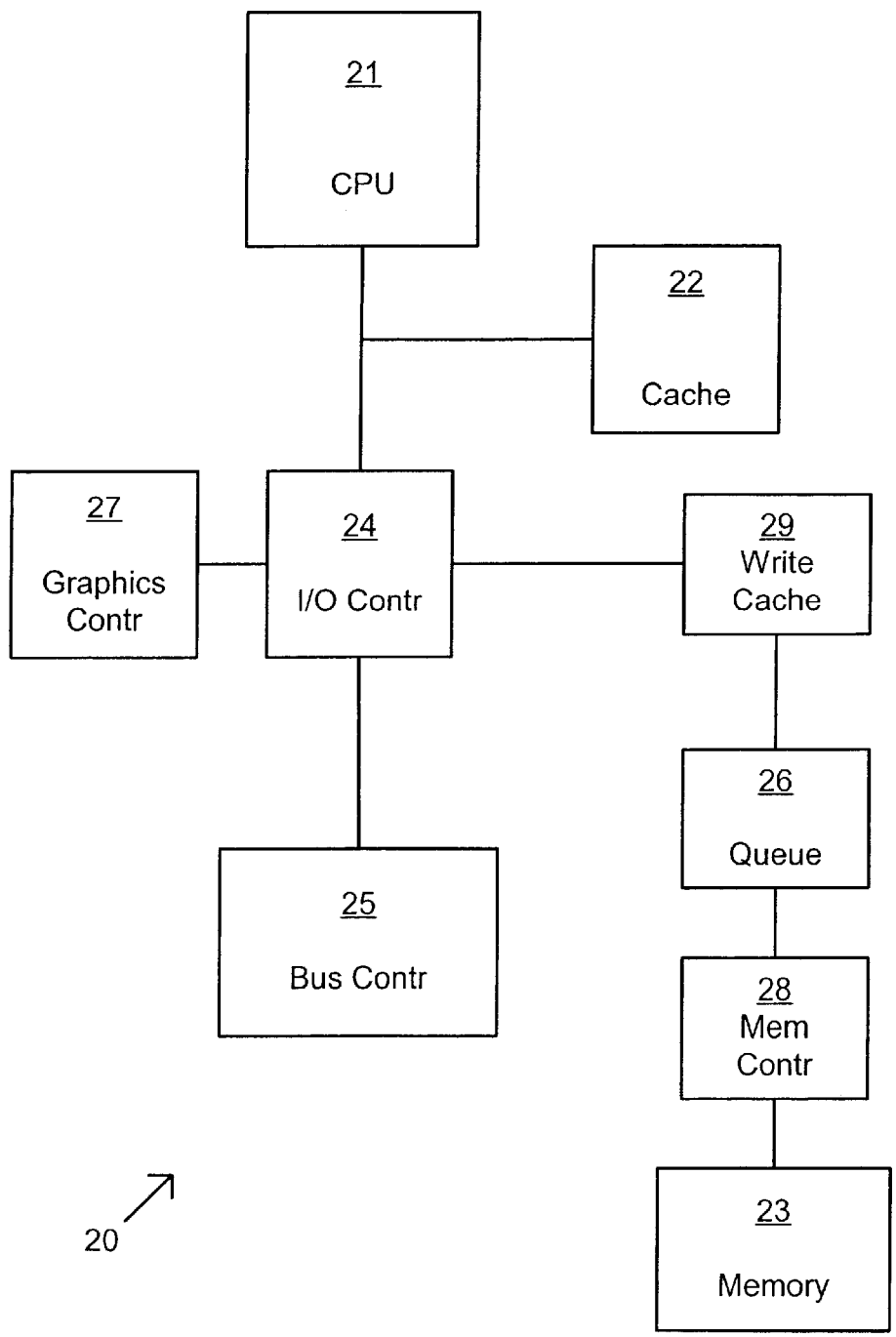
FIG. 2 shows a computer system of the invention.

FIG. 2 shows a simplified block diagram of a system 20 of the invention. CPU 21, cache memory 22, memory 23, bus controller 25 and graphics controller 27 can operate much as before. In one embodiment, those devices can be unchanged from their prior art counterparts processor 11, cache memory 12, memory 13, bus controller 15 and graphics controller 27. However, system 20 includes write cache 29, which can be used to collect write data that is destined for writing into memory 23, and organize that data in specific ways so that fewer overall writes may be necessary than in conventional systems.

Whenever CPU 21 performs a data write function, that data is written not only to cache memory 22 for immediate use by the currently executing software, but is also written to main memory 23 so that main memory 23 will have an updated version of the data. It is important that main memory be updated within a reasonable time, because it is unpredictable how soon that data will be read from main memory 23 to be used again. If CPU 21 reads the previously written data for some other use, it is likely that the read operation will retrieve the data from cache memory 22, where it was initially written. In that case, it is relatively unimportant whether the data has yet been updated in main memory 23. However, if CPU 21 reads the data after a substantial delay, it is possible that the cache line containing that data will have been purged from cache memory 22, and the data will have to be retrieved from main memory 23. In that case, it is imperative that CPU 21 retrieves the latest version of the data, so it is important that the write data has been written to main memory 23 by that time.

Other devices, such as graphics controller 27 and bus controller 25, may also perform read and write operations to memory, but they generally do not have access to cache memory 22, so they must deal solely with main memory 23. When performing a read, it is important that they read the latest version of the data, so this increases the need to update main memory 23 as soon as is feasible after CPU 21 has changed it. One embodiment of the invention therefore implements a write-through cache system, so that every write by the CPU is immediately sent to I/O controller 24 for updating main memory 23 through write queue 26.

Graphics controller 27 and bus controller 25 can also write data to main memory, so they can transmit write data destined for queue 26, from where it will be written to main memory. Writes from CPU 21, bus controller 25, and graphics controller 27 may come at any time relative to each other. In a conventional system, these writes may therefore be randomly intermingled in queue 26 on a first-come, first served basis, potentially resulting in multiple separate writes to the same block of memory.

Write cache 29 can be strategically placed between I/O controller 24 and write queue 26 so that the write data can be temporarily stored and reorganized in ways that reduce the number of write operations to memory 23, thereby improving the efficiency of the overall memory system.

A data write operation writes data to a particular location. Since CPU 21 operates primarily out of cache memory, in one embodiment this write operation can write data first to cache memory 22. At the same time, or shortly thereafter, the same data can be sent to I/O controller 24 for writing to the location in main memory that corresponds to the location in cache that was just updated. 110 controller 24 can then transmit this data to write cache 29, where it can be organized with other write data for efficient transmission to write queue 26. Write queue 26 can buffer the data and present it to memory controller 28 in the same order in which it was received from write cache 29. Memory controller 28 can then write the data into main memory 23. Since a memory takes a predetermined amount of time to read or write data, and the data requests may come at unpredictable times, write queue 26 can smooth out the process by holding any data that comes in faster than it can be written to memory.

Figure 3:
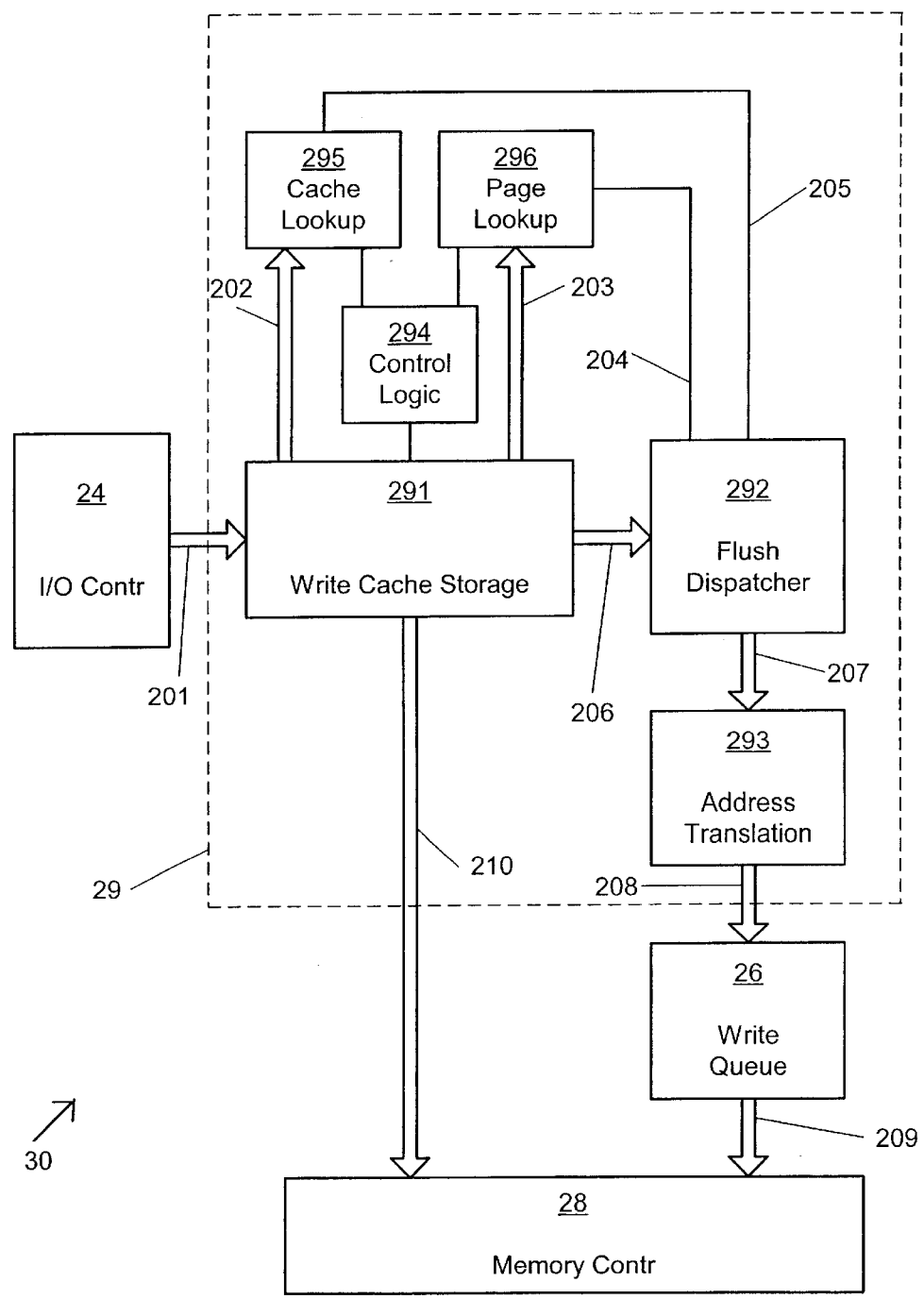
FIG. 3 shows a block diagram of the write cache logic.

FIG. 3 shows a more detailed view of write cache 29. Write cache 29 can receive memory write requests in the form of data and address information from I/O controller 24. The details of I/O controller 24 are not shown. However, those familiar with computer architecture will appreciate that it can contain interfaces to a processor bus, a graphics controller, at least one bus controller, and write cache 29, as well as arbitration and control logic to control the flow of data between those interfaces. When the data and address information is received over bus 201, that information can be stored in write cache storage 291, which can be a memory circuit. The term "bus" in this context refers to a connection containing multiple lines to move data between two or more points. Overall control of operations within write cache 29 can be provided by control logic 294. The addresses stored in write cache storage 291 can be provided over bus 202 to cache lookup logic 295, which can compare a portion of the address of the incoming request (either read or write) with the current contents of the write cache. If the address matches, the block of data containing the address of the request already exists in the write cache. This is useful in partial cache writes, which are described later.

Once it has been determined that a specific entry in write cache storage 291 will be flushed, or dispatched, meaning that it will be written from write cache 29 to memory and purged from write cache storage 291, the address and associated valid bits can be passed to flush dispatcher 292 over bus 206. An "entry" can be a cache line, which can be 64 bytes in size. Page lookup logic 296 can receive the most significant bits of the address over bus 203 of the entry being flushed to memory, and compare them with the equivalent bits of all other valid address entries in the cache. This can be used to determine whether other entries are within the same block of memory and should be flushed together as a related group. The size of the block being thus considered can be programmable. This feature is described later in more detail. Data to be flushed can be presented to address translation logic 293 over bus 207.

An address conversion step can be performed before the data is sent to the memory controller. In most modern computer systems, the software operates with virtual addresses rather than physical ones. This allows the computer to physically interface with much more memory than the software can comprehend. These virtual addresses must be converted to the assigned physical addresses before the address and data information is actually presented to memory. Since the addresses presented to write cache 29 by I/O controller 24 are virtual addresses, these can be converted to the actual physical addresses by address translation logic 293. Such virtual-to-physical address translation processes are well known in the computer field, and are not described in further detail herein.

Once the address translation has taken place, the physical address can be presented over bus 208 to write queue 26 in preparation for the write operation to memory controller 28. When memory controller 28 is ready to accept a write request, it can receive the physical memory address information over bus 209, and the associated data information over bus 210. Since flush dispatcher 292, address translator 293, and write queue 26 are concerned primarily with addresses rather than the associated data, it may not be necessary to funnel the associated data through these devices. In one embodiment, the data is simply held in write cache storage logic 291, and presented to memory controller 28 at the same time as the associated address information.

The logic for organizing the data in write cache 29 can perform multiple functions, either separately or together. Some of the processes that can be performed by this logic are described in more detail below:

Spatial Locality

Write cache 29 can flush entries to memory based on the proximity of the various entries to each other. For example, if several sequentially flushed entries are within the same memory page, that page of physical memory will only have to be opened once, and all the related entries can be written into it before another page of memory is opened. Since opening a page of memory can be time-consuming, this can result in a significant savings in time. Proximity does not have to be based on pages, but may also be based on other block sizes as well, such as eight cache lines. A cache line can be 64 bytes, so a block size of eight cache lines in that case would be 512 bytes beginning on a cache line boundary. The block size to be used in these comparisons can be programmable, which can be used to tune the memory system for efficient operation with the particular system parameters. In one embodiment, the block size can be reprogrammed on the fly, so that block size can be dynamically changed to tune the memory system for the application currently running.

Various criteria can be used to determine which entry in the write cache will be flushed first. Once that decision has been made, other entries that are within the same block can be identified and flushed. For example, when a flushing operation begins, the oldest entry may be flushed. Then page lookup logic 296 can be used to identify all other entries in write cache 29 that are within the same block, by performing a comparison of the first chosen address with all other entries in the write cache. This comparison can be performed with a content addressable memory (CAM) function. In one embodiment, block size is determined by ignoring a specific number of the least significant bits, and performing the compare only on the bit positions above that range. This allows a quick and simple comparison with a block size that is a power of two, for example, 128 bytes or 512 bytes. Flushing can continue as long as entries remain in write cache that are within the defined block.

Figure 4:
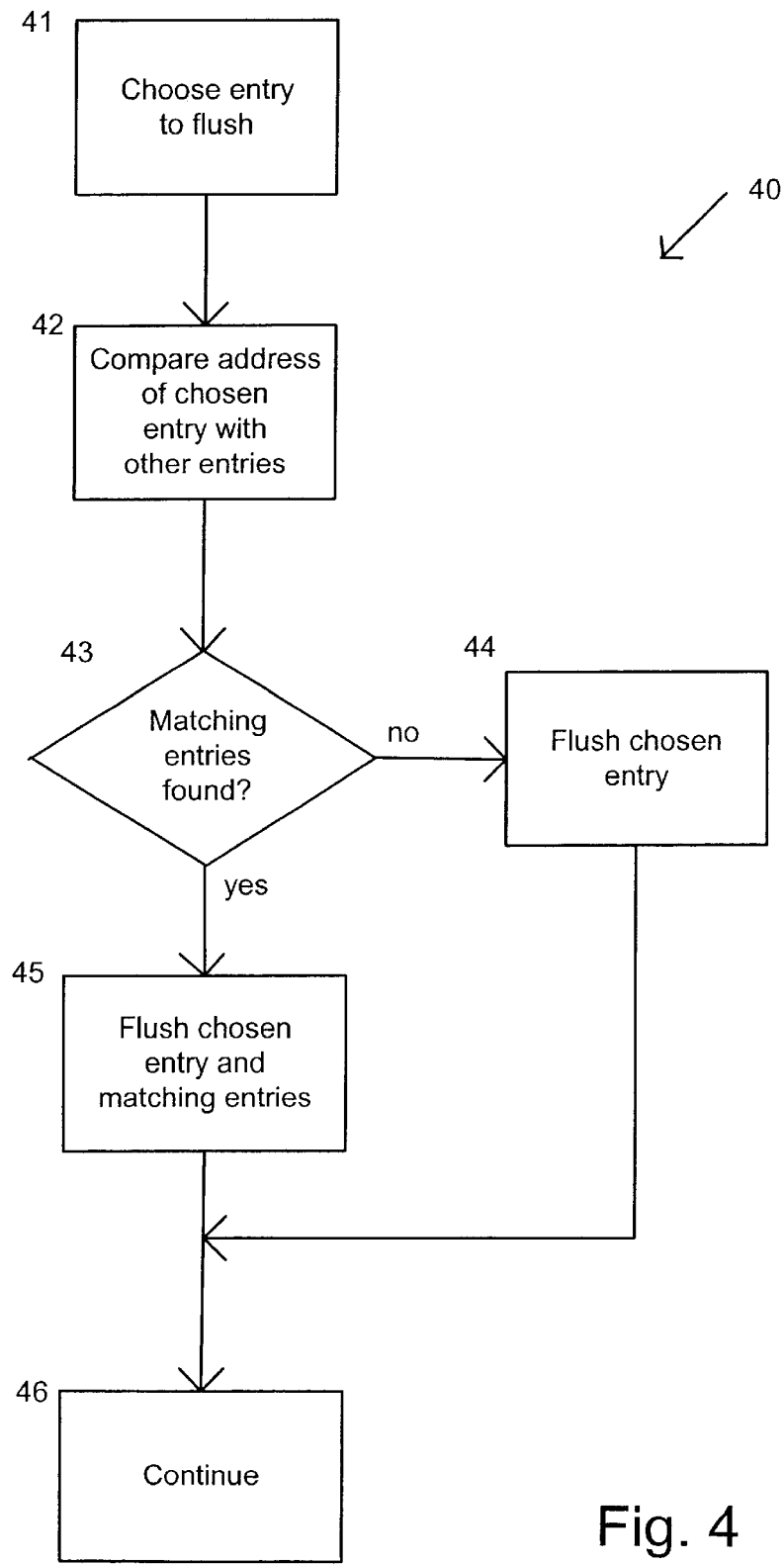
FIG. 4 shows a flow chart of a flush sequence involving spatial location.

FIG. 4 shows a flow chart 40 of this process. At step 41, an entry is chosen to be flushed from write cache by writing it to memory. Various criteria can be used to make the choice. At step 42 the address of the chosen entry, or at least an upper portion of the address, can be compared with the addresses of all the other entries in the write cache. At step 43, it is determined whether the comparison found any matches in the write cache. If no matches were found, the chosen entry can be flushed at step 44. However, if one or more matches were found, the chosen entry and all the matching entries can be flushed at step 45. In either case, after the flushing operation is complete, processing can continue at step 46.

The organization of flow chart 40 implies that nothing is flushed until the comparisons have been made and related entries identified. However, in one embodiment, the chosen entry can begin the flushing process before or during the time the comparisons are being conducted. This can save time by performing the comparison operation in parallel with the first flushing operation.

Triggers to Initiate a Flush Operation

Entries can be flushed based on how long they have been in the write cache, with the oldest entries being flushed first. The relative "age" of the entries can be determined by assigning a counter value to each entry as it is placed in write cache 29, and incrementing the counter after each assignment. The entries with the smallest values were entered first and are therefore the oldest entries. A pseudo least-recently-used (LRU) mechanism can be used to initiate the flushing operation. The write cache can stall (not flush any entries) as long as the total number of entries in write cache storage 291 is less than a predetermined low threshold value. Once the number of entries exceeds the low threshold, the oldest entry can be flushed first, followed by other entries determined to be associated with the oldest entry. The entries thus associated with the oldest entry can be determined by various criteria, such as the spatial location criteria previously described. It should be noted that the first entry to be flushed can also be based on other criteria, without affecting the use of a low threshold to initiate flushing.

Once a flush operation has been triggered as described above, the end of the flushing operation may be based on other criteria. In one embodiment, after all related entries have been flushed, write cache 29 will again examine the number of entries remaining in write cache 29, and will stall until that value exceeds the low threshold.

A high threshold can also be used to affect the flushing operation. Memory operations can have high or low priority, with all high priority operations being interleaved so that no high priority memory access will have to wait too long for its turn. Low priority operations, on the other hand, will typically have to wait until all high priority operations have been completed. Write flushing operations can normally be assigned to low priority. However, if the number of entries in write cache storage 291 exceeds a high threshold value (which is higher than the low threshold value), the resulting flushing operations can be assigned to the high priority category. This can prevent write cache storage 291 from being unable to accept new entries because it filled to capacity while the flushing operations were waiting for other, higher-priority, memory operations to complete. In one embodiment, write cache 29 can hold 16 cache lines, with a low threshold value of 4 cache lines and a high threshold value of 8 cache lines.

Figure 5:
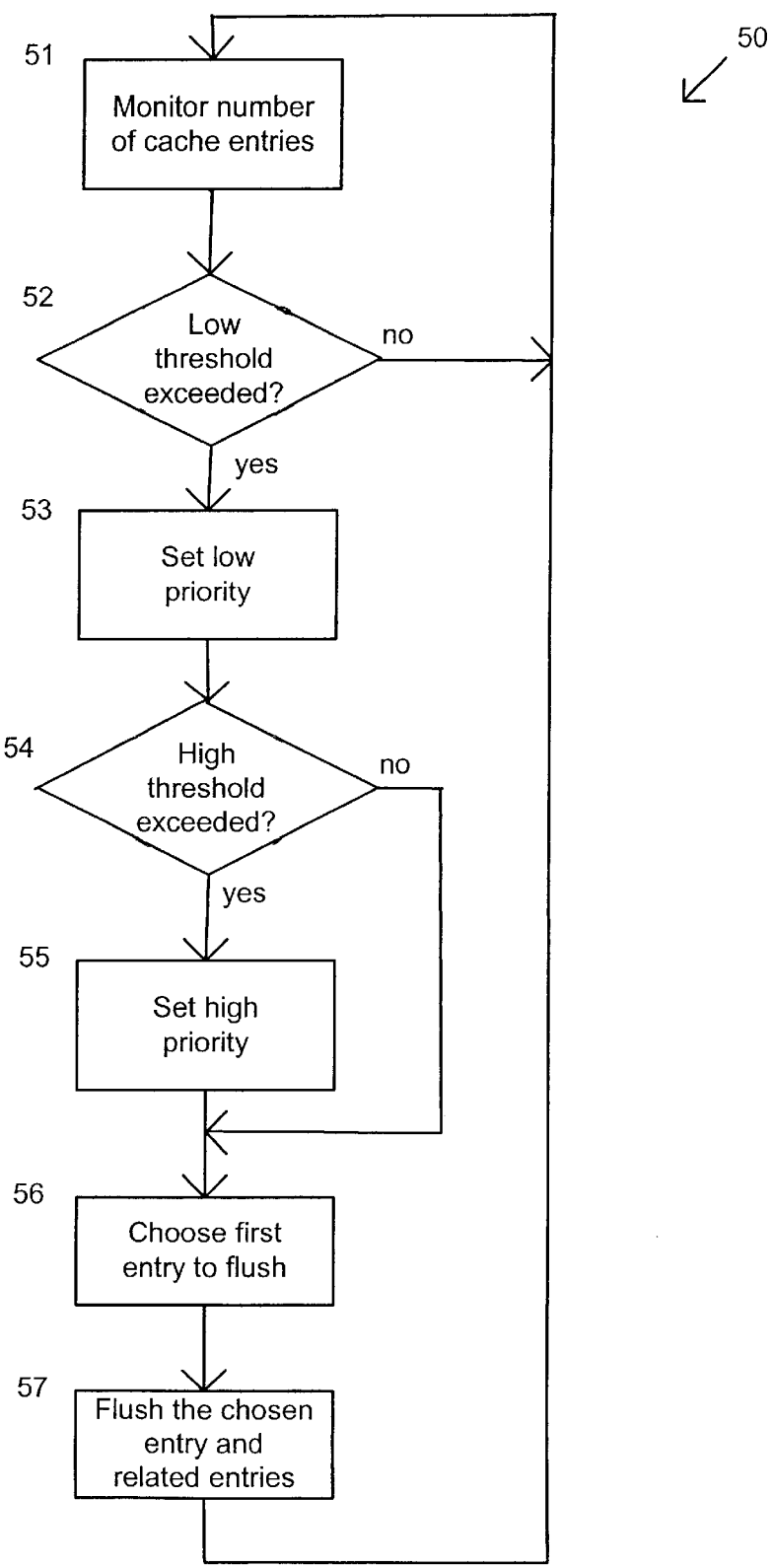
FIG. 5 shows a flow chart of triggering a flush operation.

FIG. 5 shows a flow chart 50 of this process. At step 51, the number of entries in the write cache is monitored. If the number of entries does not exceed the low threshold value, monitoring continues by looping through steps 51 and 52. Once the number of entries exceeds the low threshold value, processing moves to step 53, where the priority for flushing operations can be set or retained at the low priority level. As previously described, this can cause the memory operations triggered by flushing to wait on all high priority memory operations to complete. At step 54, the number of entries in write cache is checked to see if it also exceeds the high threshold value. If it does, the priority for flushing operations can be set at the high priority level. With this priority, memory operations triggered by flushing will not have to wait for all high priority memory operations to complete. If the number of entries does not exceed the high threshold value at step 54, step 55 is skipped and the low priority status is retained. In either case, once priority is set, the first entry for flushing is chosen at step 56. As previously described, various methods may be used to choose which entry will be flushed first. At step 57, the chosen entry and all related entries can then be flushed. Once this happens, processing can return to step 51 to examine the number of entries in the write cache again.

Partial Writes

Although a write operation by a CPU or other device can involve writing an entire cache line, a write can also involve only a part of a cache line, and may involve writing as little as one byte. When these partial writes are sent to write cache 29, they can be merged into the associated cache line if that cache line is already stored in write cache 29. However, if no data in that cache line has previously been stored (at least not since it was last flushed), there will be no cache line to merge the partial write into. In this instance, the pertinent cache line can be retrieved from main memory and stored in write cache 29, where it can then be updated with the partial write information. Once placed in write cache 29, that cache line can remain available for updating by any further partial writes that occur before the cache line is finally flushed and written back to main memory. Whether the cache line had to be retrieved or not, this process can have the effect of merging multiple partial writes into a single cache line before flushing the cache line to main memory, thereby converting what could be multiple memory transfers into a single burst transfer.

The determination of whether the cache line associated with a partial write is already in write cache 29 can be determined by cache lookup logic 295, which can compare the upper bits of the address of the partial write with the corresponding address bits of the entries residing in write cache 29. If a match is found, the relevant cache line is already in write cache 29 and can be updated with the partial write. If a match is not found, the relevant cache line is not in write cache 29, and must be retrieved from main memory as previously described and placed in write cache 29 before it can be updated with the partial write.

Figure 6:
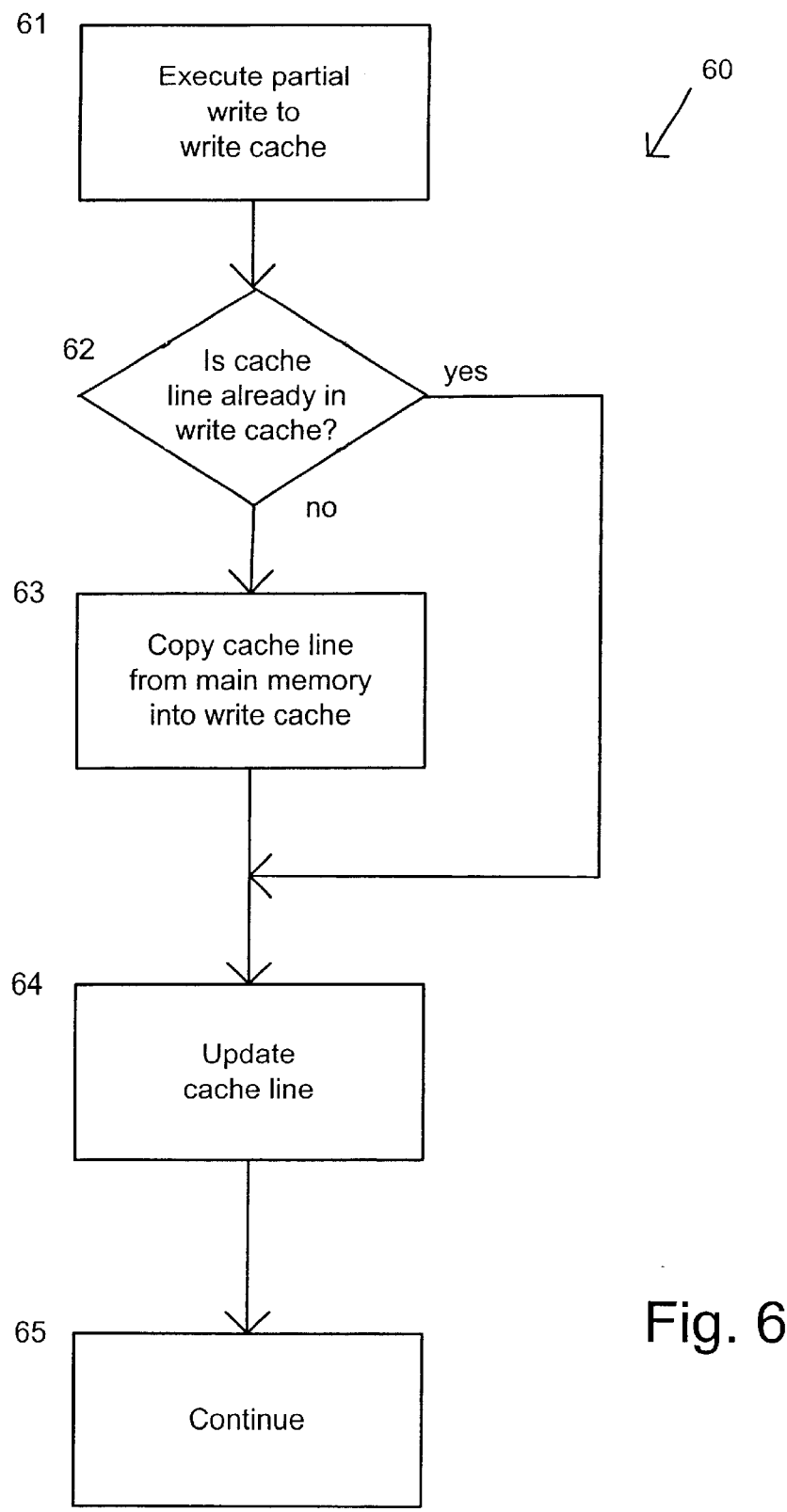
FIG. 6 shows a flow chart of a partial write operation.

FIG. 6 shows a flow chart 60 of this process. At step 61, a partial write is executed to the write cache. At step 62, the contents of the write cache are examined to determine if the cache line that includes the address of the partial write is already in the write cache. If not, that cache line is retrieved from main memory at step 63 and placed into the write cache: Whether the cache line was already in cache, or placed in cache at step 63, the cache line is then updated at step 64 by writing the data of the partial write into the correct location(s) in the cache line. Processing can then continue normally at step 65 with full writes, partial writes, or whatever else occurs while waiting for a triggering event to initiate a flush of that cache line. For example, if additional partial writes occur to the same cache line, the cache line can be updated with those partial writes, except that the cache line will already be in write cache, so retrieving it from main memory would not be necessary.

The invention can be implemented in hardware or as a method. The invention can also be implemented as instructions stored on a machine-readable medium, which can be read and executed by at least one processor to perform the functions described herein. A machine-readable medium includes any mechanism for storing or transmitting information in a form readable by a machine (e.g., a computer). For example, a machine-readable medium can include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

The foregoing description is intended to be illustrative and not limiting. Variations will occur to those of skill in the art. Those variations are intended to be included in the invention, which is limited only by the spirit and scope of the appended claims.

We claim:

1. An apparatus, comprising:
   write cache storage to store cache lines of write data received from a cache to be written to memory;
   a flush dispatcher coupled to the write cache storage to dispatch the cache lines to the memory;
   control logic to
      dispatch at least one of the cache lines to the memory if a number of cache lines in the write cache storage exceeds a first predetermined value representing less than a full write cache storage;
      not dispatch any of the cache lines to the memory if the number of cache lines in the write cache storage does not exceed the first predetermined value;
      dispatch the at least one of the cache lines with a high priority if the number of cache lines in the write cache storage exceeds a second predetermined value higher than the first predetermined value; and
      dispatch the at least one of the cache lines with a low priority if the number of cache lines in the write cache storage does not exceed the second predetermined value.

2. The apparatus of claim 1, wherein the control logic is further to dispatch an oldest one of the cache lines first if the number of cache lines in the write cache storage exceeds the first predetermined value.

3. A method, comprising:
   receiving cache lines of write data from a cache;
   storing the cache lines of write data in write cache storage;
   dispatching at least one of the cache lines to memory if a number of cache lines in the write cache storage exceeds a first predetermined value representing less than a full write cache storage;
   not dispatching any of the cache lines to the memory if the number of cache lines in the write cache storage does not exceed the first predetermined value;
   dispatching the at least one of the cache lines with a high priority if the number of cache lines in the write cache storage exceeds a second predetermined value higher than the first predetermined value; and
   dispatching the at least one of the cache lines with a low priority if the number of cache lines in the write cache storage does not exceed the second predetermined value.

4. The method of claim 3, wherein said dispatching further includes dispatching an oldest one of the cache lines first if the number of cache lines in the write cache storage exceeds the first predetermined value.

5. A machine-readable medium having stored thereon instructions, which when executed by a processor cause said processor to perform:
   receiving cache lines of write data from a cache;
   storing the cache lines of write data in write cache storage;
   dispatching at least one of the cache lines to memory if a number of cache lines in the write cache storage exceeds a first predetermined value representing less than a full write cache storage; and
   not dispatching any of the cache lines to the memory if the number of cache lines in the write cache storage does not exceed the first predetermined value;
   dispatching the at least one of the cache lines with a high priority if the number of cache lines in the write cache storage exceeds a second predetermined value higher than the first predetermined value; and
   dispatching the at least one of the cache lines with a low priority if the number of cache lines in the write cache storage does not exceed the second predetermined value.

6. The medium of claim 5, wherein said dispatching further includes dispatching an oldest one of the cache lines first if the number of cache lines in the write cache storage exceeds the first predetermined value.

7. An apparatus, comprising:
   write cache storage to receive write requests to receive write data from a cache and to store cache lines of the write data in a memory;
   a flush dispatcher coupled to the write cache storage to dispatch the cache lines to the memory;
   control logic to
      select a first cache line with a first address in the write cache storage for dispatching;
      dispatch the first cache line to the memory if a number of cache lines in the write cache storage exceeds a first predetermined value representing less than a full write cache storage;
      not dispatch any of the cache lines to the memory if the number of cache lines in the write cache storage does not exceed the first predetermined value;

determine if a second cache line in the write cache storage has a second address within a predetermined range of the first address;

dispatch the second cache line if the second address is within the predetermined range of the first address;

determine if a third cache line associated with a particular one of a plurality of partial write requests is stored in the write cache storage;

if the third cache line is not stored in the write cache storage retrieve the third cache line from the memory;

store the retrieved third cache line in the write cache storage; and merge the particular one of the plurality of partial write requests into the retrieved third cache line;

dispatch the first cache line with a high priority if the number of cache lines in the write cache storage exceeds a second predetermined value higher than the first predetermined value; and dispatch the first cache line with a low priority if the number of cache lines in the write cache storage exceeds the first predetermined value and does not exceed the second predetermined value.

8. The apparatus of claim 7, wherein the predetermined range is programmable.

* * * * *

UNITED STATES PATENT AND TRADEMARK OFFICE
CERTIFICATE OF CORRECTION

PATENT NO. : 6,658,533 B1
DATED : December 2, 2003
INVENTOR(S) : Bogin et al.

It is certified that error appears in the above-identified patent and that said Letters Patent is hereby corrected as shown below:

Column 3,
Line 37, delete "110", insert -- I/O --.

Signed and Sealed this

Twenty-third Day of March, 2004

JON W. DUDAS
*Acting Director of the United States Patent and Trademark Office*